US00RE37831E

(19) United States
(12) Reissued Patent
Thies

(10) Patent Number: US RE37,831 E
(45) Date of Reissued Patent: Sep. 10, 2002

(54) SOIL SEPARATION CHANNEL FOR DISHWASHER PUMP SYSTEM

(75) Inventor: Edward L. Thies, Dayton, OH (US)

(73) Assignee: Whirlpool Corporation, Benton Harbor, MI (US)

(21) Appl. No.: 09/599,681

(22) Filed: Jun. 22, 2000

Related U.S. Patent Documents

Reissue of:

(64) Patent No.: 5,803,100
Issued: Sep. 8, 1998
Appl. No.: 08/694,216
Filed: Aug. 8, 1996

U.S. Applications:

(60) Provisional application No. 60/003,275, filed on Aug. 25, 1995.

(51) Int. Cl.[7] ..... B08B 3/02

(52) U.S. Cl. ..... 134/10; 134/111; 134/104.1; 134/104.4; 134/25.2; 210/407

(58) Field of Search ..... 134/104.9, 104.1, 134/109, 110, 111, 176, 179, 56 D, 57 D, 58 D, 10, 25.2; 210/407

(56) References Cited

U.S. PATENT DOCUMENTS

| | | | | |
|---|---|---|---|---|
| 1,256,557 A | | 2/1918 | Heermans | 134/111 |
| 1,583,236 A | * | 5/1926 | Murrish | |
| 2,287,628 A | | 6/1942 | McMahan | 141/9 |
| 2,854,141 A | | 9/1958 | Barnstead | 210/167 |
| 2,862,510 A | | 12/1958 | Geiger et al. | 134/111 |
| 3,051,182 A | | 8/1962 | Gibson | 134/108 |
| 3,082,779 A | | 3/1963 | Jacobs | 134/174 |
| 3,322,285 A | * | 5/1967 | Lopp | |
| 3,575,185 A | * | 4/1971 | Barbulesco | |
| 3,669,132 A | * | 6/1972 | Mamrose | |
| 3,807,419 A | | 4/1974 | Cushing et al. | 134/104 |
| 3,989,054 A | * | 11/1976 | Mercer | |
| 4,038,103 A | | 7/1977 | Grunewald | 134/104 |
| 4,039,452 A | | 8/1977 | Fernandez | 210/106 |
| 4,085,761 A | | 4/1978 | Grunewald | 134/104 |
| 4,150,679 A | | 4/1979 | Cushing et al. | 134/104 |
| 4,150,680 A | | 4/1979 | Johnson et al. | 134/104 |
| 4,228,962 A | | 10/1980 | Dingler et al. | 241/46 |
| 4,243,431 A | | 1/1981 | Dingler et al. | 134/104 |
| 4,297,210 A | * | 10/1981 | Delfosse | |
| 4,319,599 A | * | 3/1982 | Dingler et al. | |
| 4,346,723 A | * | 8/1982 | Geiger | |
| 4,347,861 A | * | 9/1982 | Clearman | |
| 4,392,981 A | * | 7/1983 | Meyers | |
| 4,468,333 A | | 8/1984 | Geiger | 210/798 |
| 4,559,959 A | * | 12/1985 | Meyers | |
| 4,673,441 A | * | 6/1987 | Mayers | |
| 4,971,518 A | | 11/1990 | Florin | 415/121.2 |
| 4,972,861 A | * | 11/1990 | Milocco et al. | |
| 5,097,855 A | * | 3/1992 | Martinsson et al. | |
| 5,165,433 A | * | 11/1992 | Meyers | |
| 5,333,631 A | * | 8/1994 | Kirkland et al. | |
| 5,345,957 A | * | 9/1994 | Cooper et al. | |
| 5,377,707 A | | 1/1995 | Young, Jr. | 134/104.1 |
| 5,429,679 A | | 7/1995 | Young, Jr. | 134/25.2 |
| 5,433,232 A | | 7/1995 | Young, Jr. | 134/111 |
| 5,450,868 A | | 9/1995 | Young, Jr. | 134/111 |
| 5,579,790 A | | 12/1996 | Edwards et al. | 134/104.1 |
| 5,623,956 A | | 4/1997 | Kirkland | 134/104 |
| 5,711,326 A | | 1/1998 | Thies et al. | 134/104.4 |
| 5,848,601 A | | 12/1998 | Thies | 134/104 |

FOREIGN PATENT DOCUMENTS

| | | | |
|---|---|---|---|
| DE | 2451822 | 6/1976 | A47L/15/42 |
| DE | 2022270 | 5/1980 | |
| GB | 1352655 | 5/1974 | B04B/5/12 |
| GB | 2277678 A | 9/1994 | A47L/15/42 |

* cited by examiner

*Primary Examiner*—Frankie L. Stinson
(74) *Attorney, Agent, or Firm*—Joel M. Van Winkle; Robert O. Rice; Thomas J. Roth

(57) ABSTRACT

A soil separator for a dishwasher includes a centrifugal soil collection wall surrounded by a spill over guide channel, surrounded by a shallow annular soil accumulator channel. The soil accumulator channel is open to the dishwasher chamber but covered by a filter screen. The accumulator channel is shallow beneath the screen and empties downwardly into an accumulator sump where accumulated soil is periodically drained. The shallow accumulator channel allows water to flush an inside of the screen to carry soil to the accumulator sump.

39 Claims, 4 Drawing Sheets

SOIL SEPARATION CHANNEL FOR DISHWASHER PUMP SYSTEM

Matter enclosed in heavy brackets [ ] appears in the original patent but forms no part of this reissue specification; matter printed in italics indicates the additions made by reissue.

This application claims the benefit of U.S. Provisional Application No.: 60/003,275 filed Aug. 25, 1995.

BACKGROUND OF THE INVENTION

The present invention is directed to a soil separator for a dishwasher and particularly an arrangement between a soil separator chamber and a soil accumulator chamber which provides an improved apparatus and method for collecting and filtering soil from dishwasher water.

A known arrangement for removing soil from dishwasher water is described in U.S. Pat. No. 5,165,433. This apparatus includes a combination motor-pump and soil separator assembly. The motor-pump assembly includes a wash impeller, which operates within a pump cavity located within the soil separator. As the impeller operates in a wash or rinse mode, a swirling motion is created in the wash liquid passing through the pump cavity, thereby creating a centrifugally sampled annular layer of wash liquid on the annular interior wall. A portion of the wash liquid having a high concentration of entrained soil (food particles, etc.) passes over an upper edge of the annular interior wall and into an annular guide chamber.

Wash liquid from this guide chamber travels to an annular soil collection chamber at a high flow rate. This high flow rate is achieved by use of a relatively small aperture located in a lower portion of the annular wall separating the guide chamber and the soil collection chamber. Upon entering the soil collection chamber, wash liquid flows outwardly and upwardly through a screen which separates the water from the soil. The wash liquid is prevented from draining out of the soil collection chamber by a ball check valve seated within a drain port. The screen contains an annular arrangement of fine mesh filters, which prevent soil particles entrained in the wash liquid from reentering the dishwasher space. The cleansed wash liquid returns to the dishwasher floor where it is picked up by the motor driven pump for recirculation within the dishwasher.

Typically, the apparatus such as described above allows water to pass through the hole between the guide channel and the collector chamber at a rate of about 4 gallons per minute. This flow rate can cause the heavily concentrated mixture of soil and water within the accumulator chamber to be agitated, preventing soils from readily settling. With this flow rate and configuration, there may be a tendency for the mechanical filter to clog even though back wash nozzles for spraying the filter from above are provided. Collecting soil at these flow rates cause filter screens with a 0.0049 inch mesh to have a tendency to clog. It was necessary to increase screen mesh to 0.0079 inch to prevent this clogging. However, the larger mesh screen allowed soils of larger particle size to escape through the screen and may be seen as "grit" on the dishes.

SUMMARY OF THE INVENTION

It is an object of the present invention to provide a dishwasher soil collection system which is compatible with a high flow rate soil removal dishwasher while at the same time allowing for adequate screening of soil in the dish water return to the dish compartment in a recirculating dish water system. It is an object of the invention to provide a more efficient method of soil collection and retention while reducing water and energy usage.

The objects are inventively achieved in that an annular soil separator wall is provided around the dish washer pump for accumulating solids by centrifugal action, a soil guide channel is provided surrounding the separator wall, and a shallow soil accumulator channel or "screening channel", substantially annular, is arranged beneath the filter screen surrounding the soil guide channel. The soil accumulator channel is flow connected to the guide channel by a vertical tube at a first closed end of the channel and the channel surrounds the guide channel to an open channel end which empties, to an accumulator sump having a drain port closed by a ball check valve. Water and soil proceed around the accumulator channel, soil is retained beneath the filter screen and water proceeds through the filter screen. Back wash nozzles are provided to wash the filter screen of soil from a dish compartment side of the filter screen. Thus, by directing inlet water from the guide channel to the shallow accumulator channel, the inside of the filter screen is washed by the water, while the outside of the screen is washed by the backwash nozzles above. Therefore, food particles which are temporarily dislodged from the screen by the backwash nozzles may not immediately return to the screen after the backwash nozzle passes, due to the direction of flow on an inside surface of the filter screen from the water flowing inside the accumulator channel.

Inlet water flow into the accumulator channel is directed in a circulatory path and kept in the shallow accumulator channel in close proximity with the screen. As particles are dislodged by the backwash nozzles, they are moved around toward the stagnant soil accumulator sump. The sump is located away from the accumulator channel water inlet and therefore, more isolated and stagnant, allowing soil to settle. This is due to the fact that water and soil lose velocity as they approach the accumulator sump while most of the water escapes through the screen. The accumulator sump can be configured more compact when using the shallow accumulator channel of the present invention. The physical configuration of the system reduces water held in the accumulator by 60% or greater.

DETAILED DESCRIPTION OF THE PREFERRED EMBODIMENTS

Figure 1:
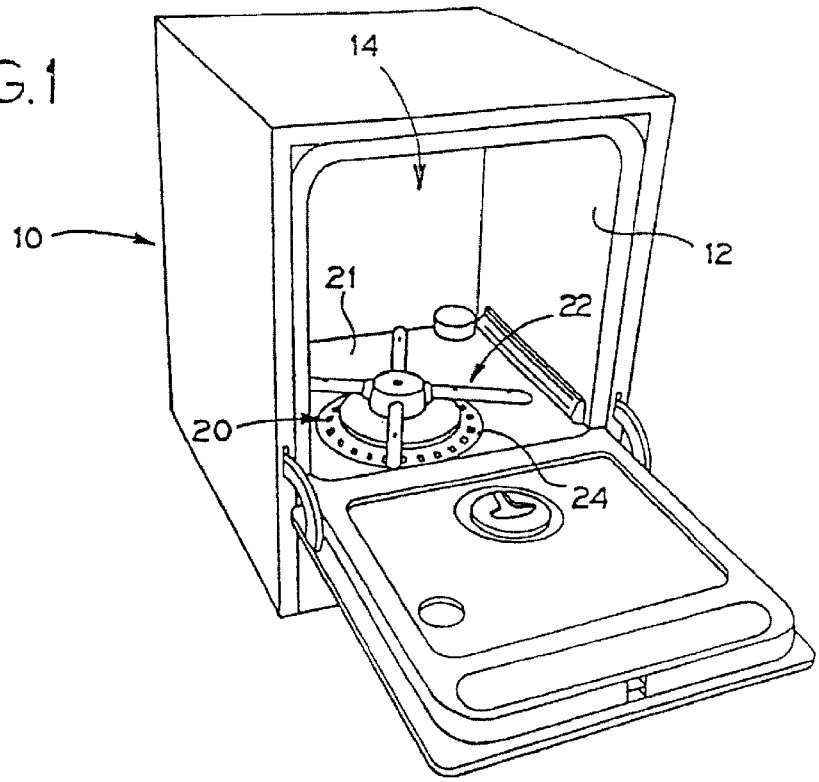
FIG. 1 is a perspective view of a dishwasher including a soil separator in accordance with the present invention.

In accordance with the invention as shown in the drawings, and particularly as shown in FIG. 1, an automatic dishwasher generally designated 10 includes an interior tank wall 12 defining a dishwashing space 14. A soil separator 20 is centrally located in floor 21 and has a lower wash arm assembly 22 extending form an upper portion thereof. Coarse particle grate 24 permits wash liquid to flow from floor 21 to soil separator 20, while preventing foreign objects, such as apricot pits and pop tops, from inadvertently entering soil separator 20.

The basic constructional features of the soil separator are explained in U.S. Pat. No. 5,165,433 herein incorporated by reference. Referring now to FIG. 3, the soil separator and pump assembly generally comprises a motor 27 having an output shaft 29 secured to base plate 30 by bolts 32. The motor 27 is a reversing motor which normally operates in a clockwise direction, as viewed in FIG. 2. When operated in a clockwise direction, such as in a wash mode or a rinse mode, the motor 27 provides a pumping action within soil separator 20, thereby providing pressurized wash liquid to lower wash arm assembly 22.

As shown in FIG. 3, lower wash arm assembly 22 includes a central hub 33 having a plurality of wash arms 35 extending radially therefrom. Each wash arm 35 includes one or more upwardly directed spray nozzles 38 for directing wash liquid upwardly within dishwashing space 14, and one or more downwardly directed spray nozzle 40 for providing a back-washing action, as will become apparent. Liquid passageway 42 in central hub 33 permits pressurized wash liquid to flow to the lower wash arm assembly 22.

Figure 2:
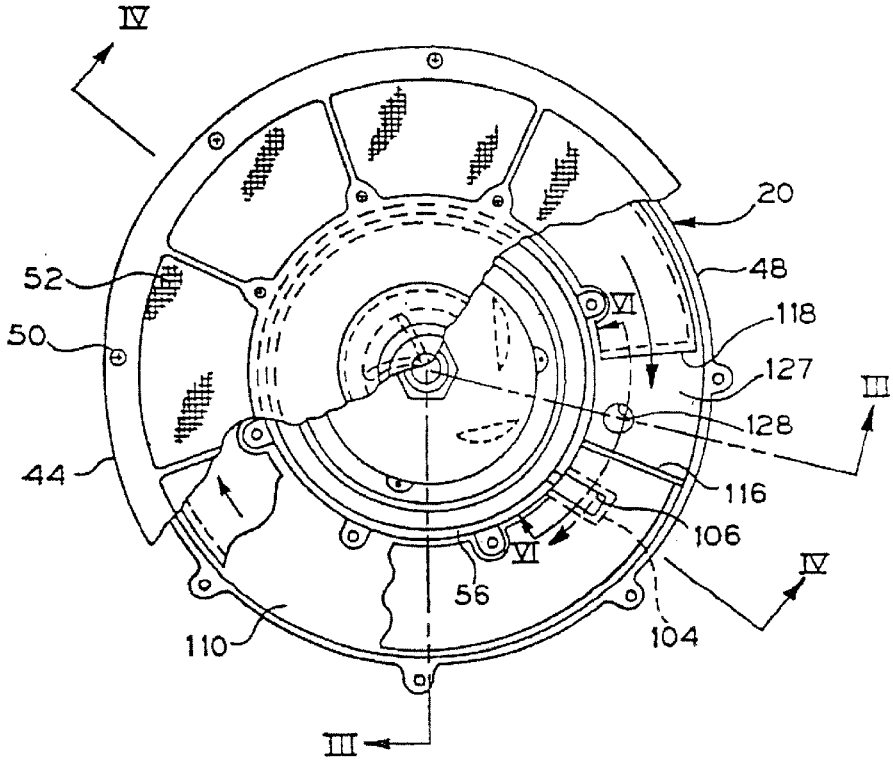
FIG. 2 is a plan view of the soil separator having the wash arm assembly removed therefrom and with a portion of the soil separator screen cut away.
Figure 3:
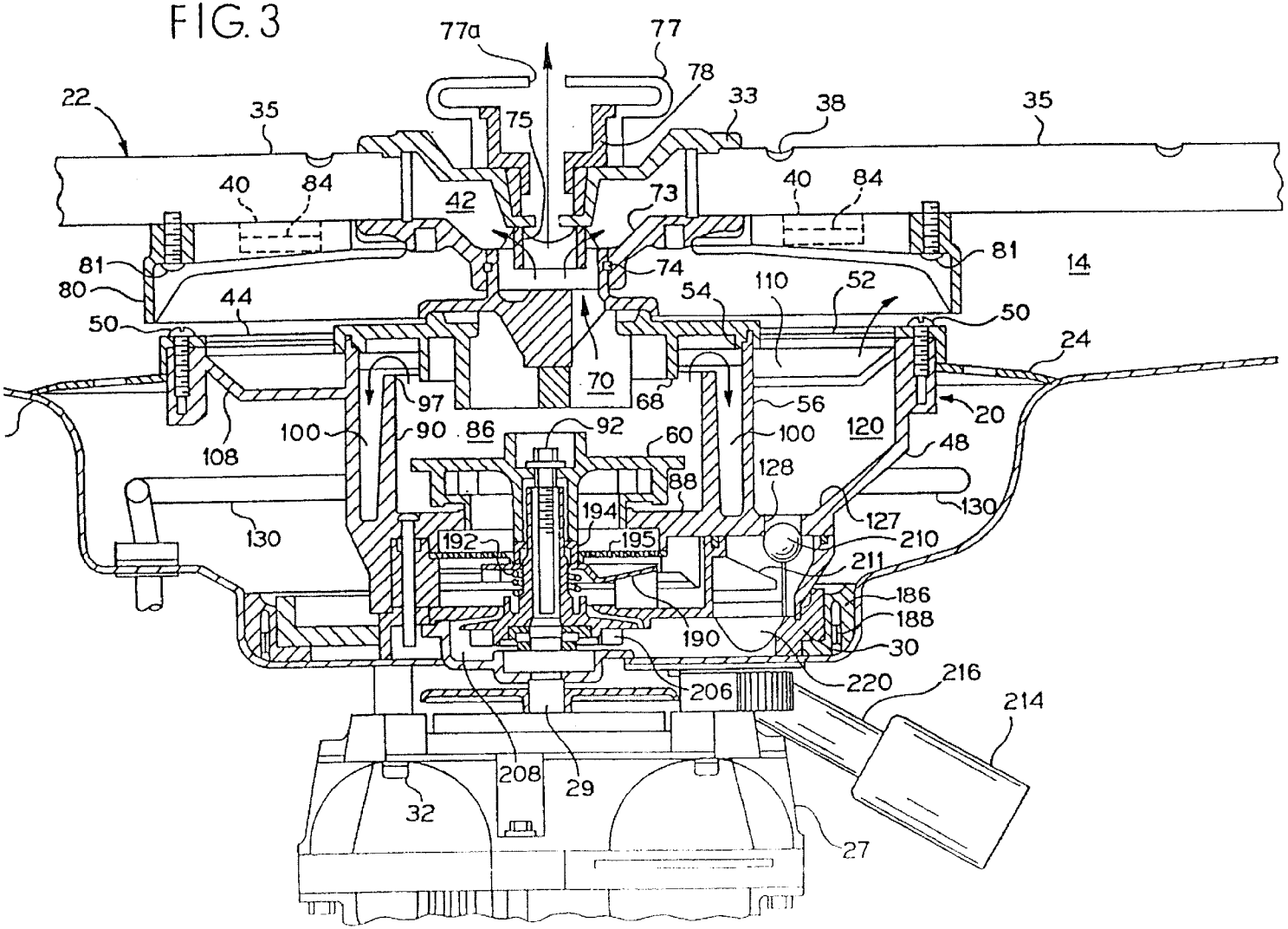
FIG. 3 is a diametric section of the soil separator including the wash arm assembly taken generally along line III-III of FIG. 2.

As shown in FIG. 2, the soil separator 20 further includes an annular cover 44 which is disposed over and secured to soil container wall 48 by screws 50. When in place, cover 44 and soil container wall 48 combine to form a low-pressure water seal, preventing leakage of water therebetween. Cover 44 includes a series of fine mesh filter segments 52 which are radially disposed about a central axis of the cover. Fine mesh filter segments 52 are preferably formed of a synthetic material such as nylon or polyester and have a mesh on the order of 0.0049" to 0.0106". Depending on the material desired to be filtered, however, a larger or smaller mesh filter may be used.

Referring back to FIG. 3, located radially inwardly from the fine mesh filter segments 52 and depending downwardly from cover 44 is an annular lip 54. Annular lip 54 forms a high-pressure seal in combination with an upstanding annular wall 56, as will become apparent.

Further located radially inwardly from the annular lip 54 of the cover 44 is a downwardly depending annular wall 68. Annular wall 68 defines a centrally located interior area containing a plurality of vanes for directing pressurized wash liquid.

In the embodiment shown, water flows upward in passages 70 and into passages 73 into wash arms 35. Water also flows into a channel pipe 75 to be directed vertically to feed an upper wash arm (not shown). The hub 33 holds the arms 35. The channel pipe 75 penetrates the hub 33. A rubber boot 77 is fastened to hub 33 and is open at a bottom thereof and has an aperture 77a for passing water therethrough. A retainer ring 78 with external threads 78a screws into the channel pipe 75 at internal threads 75a to retain the boot 77.

Under water pressure, the boot 77 seals against an upstanding tower (not shown) attached to the bottom rack (not shown) for delivery of water to the upper wash arm (not shown).

Although a top delivery of water to the upper wash arm is described, water can be delivered to the upper wash arm by a pipe such as described in U.S. Pat. No. 5,165,433. Alternately, a pipe or channel can be arranged from the passages 70 for supplying water to the upper arms and the channel can be located above the screen elements 52 extending radially from the hub 33 on the floor 21 of the dish compartment.

Referring to FIG. 3, it may be seen that lower wash arm assembly 22 is freely rotatably mounted about a seal ring 74. A filter guard 80 is mounted to wash arms 35 by screws 81. Filter guard 80 overlies the fine mesh filter segments 52 of cover 44, protecting fine mesh filter segments 52 from damage caused by falling utensils or tableware. In operation, pressurized wash liquid flows past into wash arms 35. Upwardly directed nozzles 38 are positioned on wash arms 35 so as to provide a chordally directed thrust, causing lower wash arm assembly 22 to rotate about the seal ring 74 when pressurized wash liquid is pumped through nozzles 38.

As lower wash arm assembly 22 rotates, pressurized wash liquid is emitted from downwardly directed nozzles 40. A deflector tab 84 integrally formed as part of filter guard 80 is disposed directly beneath each nozzle 40, impinging on the flow of wash liquid emitted therefrom. As the flow of water from each nozzle 40 strikes the associated deflector tab 84, a fan-shaped spray is formed. Each fan-shaped spray sweeps the top of the fine mesh filter segments 52 as lower wash arm assembly 22 rotates, thereby providing a back-washing action to keep fine mesh filter segments 52 clear of soil particles which may impede the flow of cleansed wash liquid into dishwashing space 14.

The wash impeller 60 is located within pump cavity 86. Pump cavity 86 is generally defined by the soil separator lower housing wall 88, an inside upstanding annular wall 90, and cover 44.

Wash impeller 60 is secured to the output shaft 29 of pump motor 27 by impeller retaining bolt 92, and pumps wash liquid when in operation. The majority of the pressurized wash liquid enters the area beneath the cover 44 defined by downwardly depending annular wall 68, and is directed to the lower wash arm and to the upper wash arm. Under normal operating conditions, flow of pressurized wash liquid is provided to the lower wash arm and to the upper wash arm.

During normal operation, a third portion of the wash liquid is maintained within the soil separator to be cleansed and returned to circulation. In pump cavity 86, a portion of the wash liquid having a high concentration of entrained soil tends to accumulate on the inside upstanding annular wall 90. The swirling motion of the liquid tends to carry the soil upwardly over the upper edge 97 of wall 90, whereupon the soil-laden liquid collects within annular guide chamber 100 defined between the inside upstanding annular wall 90 and the outside upstanding annular wall 56. Undesirable pressure loss within the annular guide chamber 100 is prevented by forming a relatively water-tight, high pressure seal at the juncture of cover 44 and the outside upstanding annular wall 56.

Figure 4:
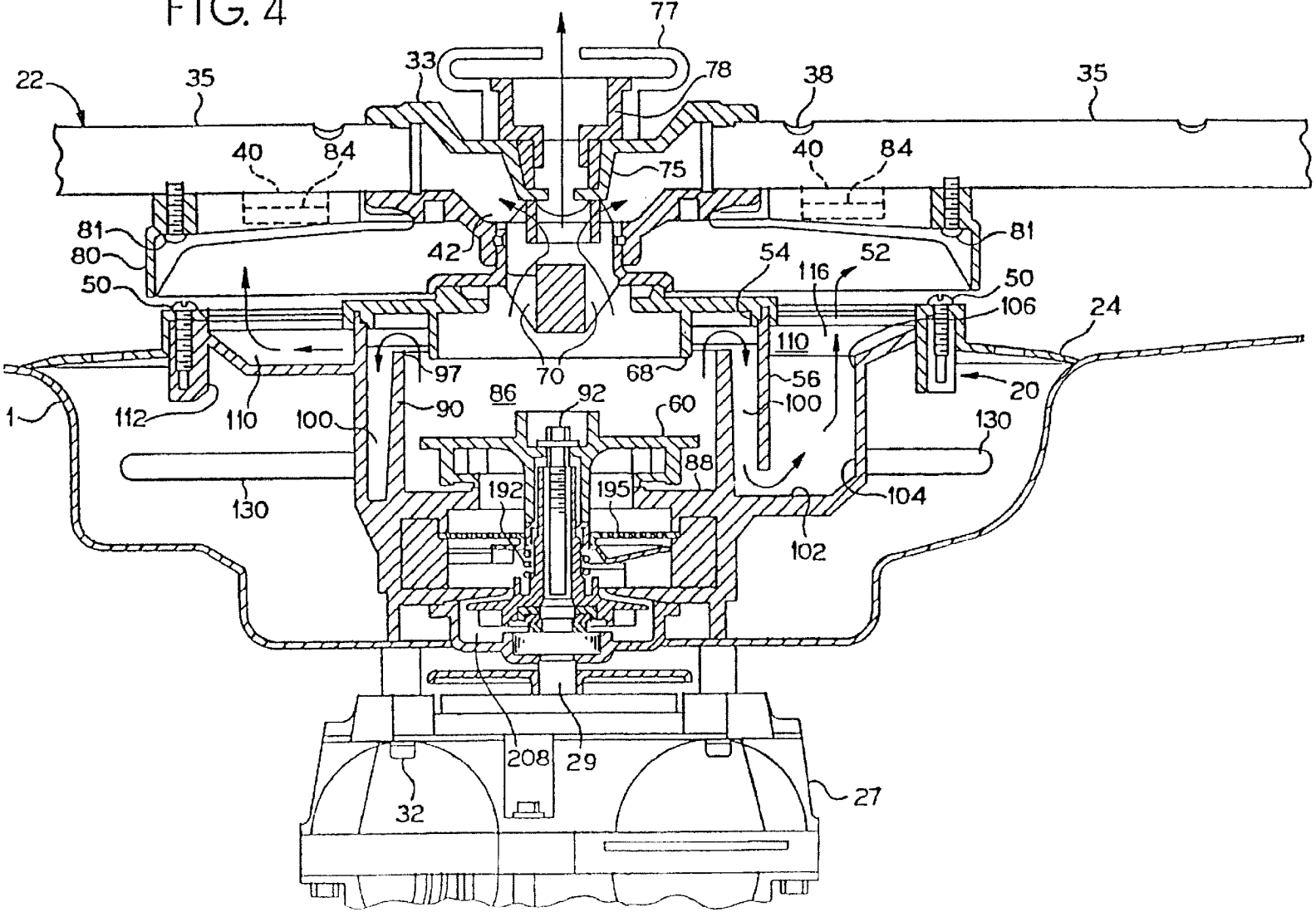
FIG. 4 is a sectional view of the soil separator taken generally along line IV—IV of FIG. 2.

As shown in FIG. 4, soil laden water flows through an inlet 102 into a tube 104 and upward through a hole 106 into soil accumulation channel 110.

Although a relatively tall wall 90 is shown, it is possible to significantly shorten the wall 90 and the wall 56 and correspondingly also lower the channel 110 and still retain effective soil separation. The tube 104 can become shorter and in effect become a nearly horizontal passage into the channel 110.

In operation the soil laden water proceeds through the hole 106 and proceeds in a clockwise direction in FIG. 2. Water passes upwardly through the screen segments 52 and the soil proceeds to the accumulator sump 120 at the second end 118. As the water proceeds around the soil separation channel its velocity slows and soil settles out into the sump 120.

By maintaining a shallow soil separation channel 11 0 under screen segments 52, from the tube 104 to the sump 120, any clogging of the screen segments 52 on an inside thereof can be effectively alleviated. When the backwash nozzle 40 passes, soil is back washed away from the screen, and water passing within the channel 110 moves the soil toward the sump 120 and prevents repositioning of the soil against the screen segments 52.

Fine mesh filter segments 52 in cover 44 permit flow of cleansed wash liquid to return to dishwasher space 14 for recirculation. Light soil particles are screened by fine mesh filter segments 52 and retained in soil accumulator sump 120. Accordingly, both heavy and light soil particles remain within the soil accumulator sump 120.

Figure 6:
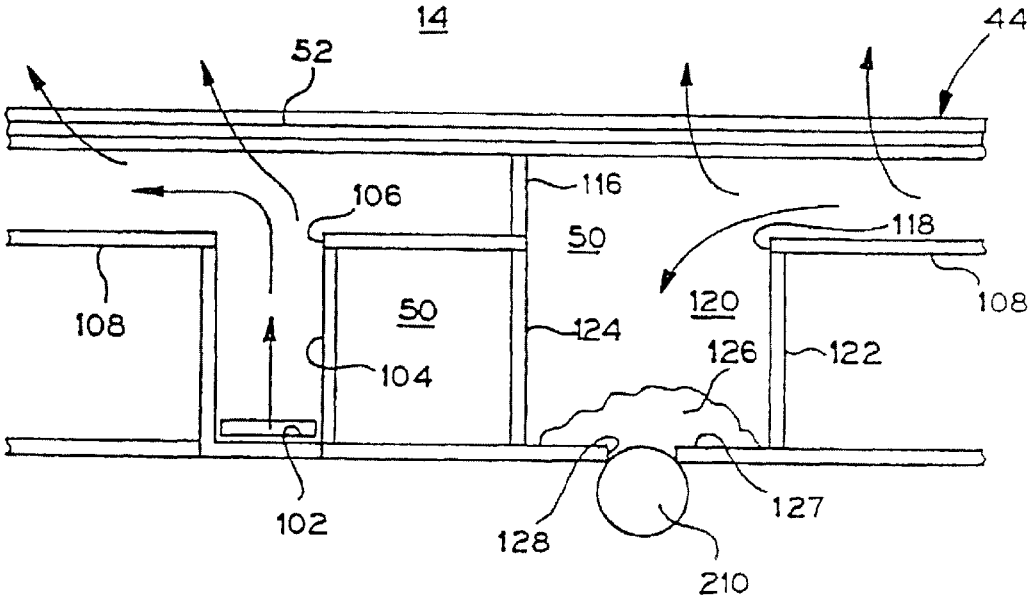
FIG. 6 is a partial sectional view taken generally along VI—VI of FIG. 2.

FIG. 6 illustrates the soil accumulator channel 110 beginning at the wall 116 and terminating at the end 118. The sump 120 is defined by walls 56, 48 and side walls 122, 124. Soil 126 is collected within the sump 120 on the floor 127 and expelled during the drain cycle through the drain port 128.

When operated in a wash or rinse mode, the dishwasher functions as a continuous fluid circuit. In a wash mode, for example, wash liquid flows from dishwashing space 14 to dishwasher floor 21 and is gravity-fed to coarse particle grate 24. Wash liquid flows past heating unit 130 to soil separator 20, where it is drawn inwardly by negative pressure created by impeller 60. Wash liquid flows over sealing ring 186, which, in combination with floor 21 and retainer ring 188, serve to support and seal the soil separator and pump assembly within the dishwasher. Wash liquid continues to flow horizontally and inwardly over base plate 30, until encountering soft soil chopper 190.

As may best be observed in FIG. 3, soft soil chopper 190 is located on motor shaft 29 and rotates therewith to macerate large soft soil particles which travel past grate 195. Torsion spring 192 both supports and drives chopper 190, urging chopper 190 upwardly against collar 194, which in turn is held in place on output shaft 29 by a downwardly depending shoulder of wash impeller 60.

After passing soft soil chopper 190, wash liquid is drawn through grate 195 and further upwardly into pump cavity 86 by wash impeller 60. Wash impeller 60 imparts a swirling motion to the wash liquid, forcing a majority of the wash liquid upwardly to the lower wash arm and to the upper wash arm. Wash liquid sprayed from upwardly directed spray nozzles 38, downwardly directed spray nozzles 40 and cleansed wash liquid emitted from fine mesh filter segments 52 into dishwashing space 14 returns to floor 21 to be recycled.

Due to centrifugal force acting on the swirling liquid in pump cavity 86, the remainder of the wash liquid forms a band or layer on the interior of inside upstanding annular wall 90. This band of wash liquid contains a heavy concentration of entrained soil particles having a relatively high specific gravity, which tend to be forced outwardly by centrifugal force. This band of wash liquid also contains approximately the same concentration of soil particles having a relatively low specific gravity representative as the wash liquid as a whole.

Figure 5:
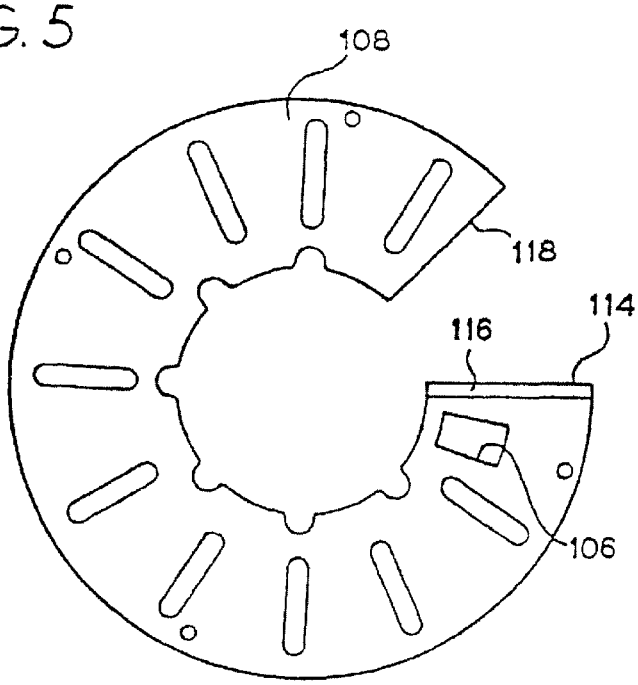
FIG. 5 is a plan view of an accumulator chamber grating.

As soil-laden wash liquid flows around soil accumulator channel 110, its velocity is reduced, permitting heavy soil particles to collect in sump 120 on lower housing wall 127. As the clockwise rotation of wash impeller 60 forces soil-laden wash liquid into soil accumulator channel 110, clockwise rotation of drain impeller 206[, as shown in FIG. 5,] causes a clockwise flow of wash liquid within drain pump chamber 208.

Pressure created by wash liquid flow within drain pump chamber 208 causes ball check valve 210 to rise from a resting position on ball check valve support 211 to a seated position on the bottom side of soil container drain port 128, as shown in FIG. 3. When so positioned, ball check valve 210 prevents flow of accumulated soil particles and wash liquid therethrough. Check valve 214 located in line with and downstream of a drain port 216 prevents air from entering the drain port during operation of drain impeller 206 in a clockwise direction.

Upon completion of a wash or a rinse cycle, a drain cycle is initiated. At that time, pump motor 27 is reversed, causing drain impeller 206 to rotate in a counter-clockwise direction[, as] *when* viewed *from a top view as shown* in FIG. 2. Drain impeller 206 causes negative pressure to be applied within conduit 220, which causes ball check valve 210 to fall away from soil container drain port 128. Soil-laden water and accumulated soil within soil accumulator sump 120 is rapidly pumped out by drain impeller 206, and expelled through drain port 216. In addition, drain impeller 206 is further in fluid connection with floor 21. Wash or rinse liquid draining from soil separator 20 accumulates on base plate 30, and is pumped out through drain port 216 along with liquid from floor 21. Accordingly, when operated in a counterclockwise direction, drain impeller 206 rapidly and effectively drains soil separator 20.

An alternate further embodiment (not shown) includes providing [that] *a* plate 108 *which* is substantially annular with a plurality of spaced apart slots[and that the]. *The* sump 120 is also annularly shaped and is arranged below and coextensive with said plate 108. Soil accumulated on said plate passes through said slots to settle to the sump below where a port 128 operates during the claim cycle as described above.

A further alternate embodiment (not shown) provides that two sumps, such as the sump 120 be provided below the plate 108 substantially located at 180° diametrically opposed, and that 180° of the cover 44 be fine mesh screen elements and 180° of the cover 44 be coarse mesh screen elements. The screening channel is divided into two sub channels, a fine screening channel (0.0049" mesh) and a coarse screening channel (0.0079" mesh). When the fine screening channel is sufficiently clogged to cause a predetermined back pressure, a valve means opens the fine screening channel to the coarse screening channel to allow soil laden water to at least be coarse screened. As described above, the fine and coarse screening channels are arranged to be shallow to allow soil to be washed from inside the screens.

Both of these alternate developments are the subject of other patent applications.

Although the present invention has been described with reference to a specific embodiment, those of skill in the art will recognize that changes may be made thereto without departing from the scope and spirit of the invention as set forth in the appended claims.

The embodiments of the invention in which an exclusive property or privilege is claimed are defined as follows:

1. A soil separator for a dishwasher comprising:

a cylindrical wall;

a water impeller arranged for rotation within said cylindrical wall;

a shallow arcuate channel covered by a screen and flow connected to the area within the cylindrical wall;

a guide channel surrounding said cylindrical wall between said cylindrical wall and said shallow arcuate channel and said cylindrical wall comprises a height providing a spill over into said guide channel:

an inlet tube from said guide channel into said shallow arcuate channel; and a soil accumulation area for collecting soil from the water, flow connected to said shallow arcuate channel.

2. The soil separator according to claim 1, wherein said shallow arcuate channel comprises a substantially annular horizontal plate surrounding said guide channel elevated from a bottom of said guide channel, and said screen comprises a substantially annular horizontal screen arranged above said plate.

3. The soil separator according to claim 1, wherein said guide channel comprises an outer wall surrounding said cylindrical wall with an aperture flow connected to said inlet tube, said inlet tube located at one end of said shallow arcuate channel and said accumulator sump located at an opposite end.

4. A centrifugal soil separator, comprising:

a rotating element;

a surrounding wall;

an outlet water conduit receiving water flow from said rotating element;

a soil/water flow channel receiving water with entrained soil from adjacent said surrounding wall;

a soil screening channel having a screen element on a top side thereof for passing water therethrough while retaining soil below, said screening channel surrounding said surrounding wall, said soil/water flow channel flow connected to a first end of said screening channel; and a soil accumulator sump flow connected to a second end of said screening channel; and means for draining soil from said accumulator sump.

5. The soil separator according to claim 4, wherein said soil/water flow channel comprises an outer wall surrounding said surrounding wall and an open top annular gap provided between said surrounding and outer walls, and a vertical tube connecting said annular gap and said screening channel.

6. The soil separator according to claim 5, wherein said screening channel is formed by a substantially annular shaped plate mounted beneath an annular screening member, said substantially annular shaped plate having an aperture connected to said vertical tube, and a opening above said accumulation sump.

7. The soil separator according to claim 6, wherein said means for draining comprises a drain port closed by a ball check valve.

8. A dishwasher soil separator comprising:

a rotating wash impeller;

a circular surrounding wall;

a outlet water conduit receiving water flow from said rotating impeller;

a soil/water flow channel receiving water with entrained soil from adjacent said surrounding wall;

a soil screening channel with a soil/water inlet end having an end wall and outlet end having a discharge opening, and having a screen element on a top side thereof for passing water therethrough while retaining soil below, said screening channel surrounding said surrounding wall, said soil/water flow channel flow connected to said inlet end of said screening channel; and a soil accumulator sump flow connected to said outlet end of said screening channel; and means for draining soil from said accumulator sump.

9. The soil separator according to claim 8, wherein said soil/water flow channel comprises an outer wall surrounding said surrounding wall forming a guide channel therebetween and a spill over water path provided between said surrounding and outer walls, and a vertical tube connecting said guide channel and said screening channel.

10. The soil separator according to claim 9, wherein said screening channel is formed by a substantially annular shaped plate mounted beneath an annular screening member holding said screen clement, said substantially annular shaped plate having an aperture connected to said vertical tube, and said discharge opening is located above said accumulation sump allowing soil to pass downwardly through said opening.

11. The soil separator according to claim 8, wherein said means for draining comprises a drain port closed by a ball check valve.

*12. A centrifugal soil separator, comprising:*

*a rotating element;*

*a surrounding wall;*

*an outlet water conduit receiving water flow from said rotating element;*

*a soil screen channel having a screen element on a top side thereof for passing water therethrough while retaining soil below, said soil screen channel having a first end and a second end wherein said first end of said soil screen channel receives water flow from said rotating element;*

*a soil accumulator sump flow connected to said second end of said soil screen channel; and*

*means for draining soil from said accumulator sump.*

*13. The soil separator according to claim 12, further comprising a channel flow connected between said surrounding wall and said first end of said soil screen channel.*

*14. The soil separator according to claim 12 comprising an inlet tube connected to said first end of said soil screen channel and wherein water flow from said rotating element is directed into said soil screen channel through said inlet tube.*

*15. A centrifugal soil separator, comprising:*

*a pump cavity;*

*a wash impeller arranged for rotation within said pump cavity;*

*an outlet water conduit receiving water flow from said pump cavity;*

*a soil screen channel having a screen element on a top side thereof for passing water therethrough while retaining soil below, said soil screen channel having a first end and a second end wherein said first end of said soil screen channel receives water flow from said pump cavity;*

*a soil accumulator sump flow connected to said second end of said soil screen channel; and*

*means for draining soil from said accumulator sump.*

*16. The centrifugal soil separator according to claim 15, further wherein*

*said pump cavity has an inlet through which liquid is drawn by said wash impeller and a secondary outlet,*

*wherein wash liquid is pumped out of said pump cavity through said outlet water conduit and through said second outlet, said soil screen channel receiving water flow passing from the pump cavity through said secondary outlet.*

*17. The centrifugal soil separator according to claim 15, further comprising a channel flow connected between said pump cavity and said first end of said soil screen channel.*

*18. The centrifugal soil separator according to claim 15 further wherein an inlet tube is connected to said first end of said soil screen channel and wherein water flow from said pump cavity is directed into said soil screen channel through said inlet tube.*

*19. A centrifugal soil separator, comprising:*

*a pump cavity having an inlet, a primary outlet and a secondary outlet;*

*a wash impeller arranged for rotation within said pump cavity;*

*a soil screen channel having a screen element on a top side thereof for passing water therethrough while retaining soil below, said soil screen channel having a first end and a second end wherein said first end of said soil screen channel receives water flow from said pump cavity through the second outlet;*

*a soil accumulator sump flow connected to said second end of said soil screen channel, said soil accumulator sump having a bottom drain port closed by a check ball;*

*a drain pump chamber fluidly connected to said drain port of said soil accumulator sump; and*

*a drain impeller disposed within said drain pump chamber for drawing water with entrained soils from said soil accumulator sump through said drain port.*

*20. The soil separator according to claim 19, further comprising:*

*a conduit extending between said drain port of said soil accumulator sump and said drain pump chamber,*

*wherein said check ball is disposed within said conduit, said check ball is seated in said drain port when said drain impeller is operated in a first direction and falls away from said drain port when said drain impeller is operated in a second direction.*

*21. The soil separator according to claim 19 further wherein an inlet tube is connected to said first end of said soil screen channel and wherein water flow through said secondary outlet is directed into said soil screen channel through said inlet tube.*

*22. A centrifugal soil separator, comprising:*

*a rotating element;*

*a surrounding wall;*

*an outlet water conduit flow connected to said rotating element;*

*a soil screen channel surrounding the surrounding wall and having a screen element on a top side thereof, said rotating element flow connected to an inlet of said soil screen channel;*

*a soil accumulator sump flow connected to an outlet of said soil screen channel; and*

*a drain port in said accumulator sump.*

*23. The centrifugal soil separator according to claim 22, further comprising a channel flow connected between said rotating element and said first end of said screening channel.*

*24. The centrifugal soil separator according to claim 23, wherein said channel has an arcuate shape and extends around an outside of said surrounding wall.*

*25. A dishwasher soil separator, comprising:*

*a pump cavity;*

*a wash impeller arranged for rotation within said pump cavity;*

*a soil accumulation channel flow connected to receive liquid from said pump cavity and having a fluid filter at a fluid outlet and further having a floor;*

*a sump fluidly connected to the soil accumulation channel and extending below said floor of said soil accumulation channel; and*

*a drain opening in said sump.*

*26. The dishwasher soil separator of claim 25, wherein a first end of said soil accumulation channel is fluidly connected to said pump cavity, and a second end of said soil accumulation channel is fluidly connected to said sump.*

*27. A dishwasher soil accumulator, comprising:*

*an arcuate top wall having a filter outlet;*

*an arcuate bottom wall below said top wall;*

*inner and outer walls connected to said top and bottom walls;*

*a soil accumulating space defined by said top, bottom, inner side and outer side walls;*

*an accumulator inlet flow connected to said soil accumulating space;*

*a soil outlet open to the soil accumulating space; and*

*a chamber flow connected to said soil outlet and extending downward from the soil outlet, said chamber having a drain port.*

*28. The dishwasher soil accumulator of claim 27, further comprising an upstanding wall inside of said dishwashing soil accumulator, said accumulator inlet and said soil outlet being on opposite sides of said upstanding wall.*

*29. A method of separating soil from water in a dishwasher comprising the steps of:*

*drawing soil entrained water into a pump cavity;*

*flowing soil entrained water into a channel from said pump cavity;*

*filtering the soil entrained water and flowing the filtered water out of said channel;*

*moving at least some of the soil retained in said channel from said channel to a sump; and*

*preventing removal of soil and water from said sump and said channel through a drain opening in said sump by closing said drain opening.*

*30. A method of flowing water having soil through a dishwasher soil separator, comprising the steps of:*

*drawing soil entrained water into a pump cavity;*

*passing soil entrained water from said pump cavity into a soil accumulation channel;*

*flowing water and soil inside of said soil accumulation channel in a horizontal path;*

*flowing water out of said soil accumulation channel while removing at least some soil from the water and retaining the removed soil inside of said soil accumulation channel;*

*flowing at least some water and heavier-than-water soil from inside of said soil accumulation channel vertically downwardly into a chamber having a drain; and*

*holding the at least some heavier-than-water soil inside said chamber until said dishwasher soil separator is placed in a drain mode.*

*31. The method of claim 30, wherein the flowing vertically downward step further comprises the step of flowing the at*

*least some water and heavier-than-water-soil through a lower outlet in said accumulation channel and into said chamber, said chamber having a closed drain port.*

*32. A dishwasher soil separator comprising:*

*a pump having a primary outlet and a secondary outlet;*

*a soil accumulator having an inlet fluidly connected to the secondary outlet of the pump, the soil accumulator having a filtered outlet and a non-filtered outlet:*

*a drain port fluidly connected to the non-filtered outlet of the soil accumulator and spaced vertically downward away from the non-filtered outlet of the soil accumulator; and*

*a ball check valve below the drain port.*

*33. The dishwasher soil separator of claim 32, further comprising a sump fluidly connected to the non-filtered outlet of the soil accumulator, the drain port located at a lower portion of the sump.*

*34. The dishwasher soil separator of claim 32, further comprising a wall which extends from the non-filtered outlet downward to a floor having the drain port.*

*35. The dishwasher soil separator of claim 32, wherein the inlet and the non-filtered outlet are located at opposite end portions of the soil accumulator.*

*36. A centrifugal soil separator according to claim 12, further comprising a channel having an inlet opening adjacent said surrounding wall and an outlet opening at said first end of said soil screen channel.*

*37. A centrifugal soil separator according to claim 15, further comprising a channel having an inlet opening at said pump cavity and an outlet opening at said first end of said soil screen channel.*

*38. A dishwasher soil separator according to claim 25, further comprising a channel having an in let opening at said pump cavity and an outlet opening at said soil accumulation channel.*

*39. A dishwasher solid accumulator according to claim 32, further comprising a channel having an inlet opening at said secondary outlet and an outlet opening at said soil accumulator inlet.*

* * * * *